United States Patent [19]

Coburn

[11] 4,379,613
[45] Apr. 12, 1983

[54] SOLAR ENERGY COLLECTOR

[75] Inventor: John F. Coburn, Cranford, N.J.

[73] Assignee: Exxon Research and Engineering Co., Florham Park, N.J.

[21] Appl. No.: 236,824

[22] Filed: Feb. 23, 1981

[51] Int. Cl.³ ............................................. G02B 5/172
[52] U.S. Cl. ................... 350/96.10; 136/247; 136/259
[58] Field of Search ............... 350/96.10, 96.12, 96.15, 350/96.16, 96.24; 136/247, 259

[56] References Cited

U.S. PATENT DOCUMENTS

| 4,078,548 | 3/1978  | Kapany      | 350/96.10 |
| 4,149,902 | 4/1979  | Mauer et al.| 136/89    |
| 4,175,980 | 11/1979 | Davis et al.| 136/89    |
| 4,188,238 | 2/1980  | Boling      | 136/89    |
| 4,199,376 | 4/1980  | Sill        | 136/89 FC |
| 4,275,950 | 6/1981  | Meyer       | 350/96.10 |
| 4,292,959 | 10/1981 | Coburn, Jr. | 350/262   |

FOREIGN PATENT DOCUMENTS 436046  11/1967  Switzerland ..................... 350/96.10

OTHER PUBLICATIONS

Kazacos et al., *Solar Energy Materials*, vol. 2, No. 3, Apr.–Jun. 1980, "Fluorescent Windows for Liquid Junction . . .," pp. 333–342.

Edwards, *NASA Tech. Briefs*, Summer 1978, "Optics for Natural Lighting", pp. 209–211.

Primary Examiner—John D. Lee
Assistant Examiner—Frank Gonzalez
Attorney, Agent, or Firm—Joseph J. Dvorak

[57] ABSTRACT

The present invention comprises a planar fluorescent solar concentrator having a circular band portion within said concentrator toward which incident solar radiation is redirected. Optically coupled to said circular band portion is an optical means comprising an axially symmetrical body of light transmitting material having a circular band at one end for the receipt therein of radially directed electromagnetic radiation, said optical means including a body portion, having a coating on the exterior surfaces thereof and a generally circular second end. Light radially directed in said circular band at said first end is internally reflected in said body portion and directed toward said second end, whereby the light leaving that circular second end is distributed substantially uniformly over the entire area thereof.

7 Claims, 5 Drawing Figures

U.S. Patent   Apr. 12, 1983   4,379,613

SOLAR ENERGY COLLECTOR

FIELD OF THE INVENTION

The present invention relates to the collection of solar radiation and its transmission in the form of light to a point of use. More particularly, the instant invention is concerned with the efficient coupling of a planar luminiscent solar collector to optical wave guides.

BACKGROUND OF THE INVENTION

The economic conversion of solar energy into electrical or thermal energy requires a relatively high solar flux impinging on the conversion device. Consequently, there have been numerous attempts to collect the generally diffused sunlight falling on relatively large areas, concentrating it into a small area for more efficient conversion of the radiant energy to a more useful form of energy.

One type of solar concentrating device receiving increasing attention consists of a large area of fluorescent material on which solar radiation impinges, and as a consequence thereof, the fluorescent material emits radiation which is internally reflected within the collector and directed toward a smaller area where it is optically coupled, for example, to an energy conversion device, such as a photovoltaic cell. Examples of such devices are given in U.S. Pat. No. 4,149,902 and U.S. Pat. No. 4,188,238. Indeed, in U.S. Pat. No. 4,149,902, the photovoltaic device is contiguous with the fluorescent collector. In one embodiment of U.S. Pat. No. 4,175,980, however, the photo-voltaic device is not contiguous with the fluorescent collector, but is separated from the concentrator by means of a fiber optic mechanism.

Whatever advantages there may be in devices of the type disclosed in the above-mentioned patents, there still remains a need for efficiently joining a large surface area planar concentrator to a fiber optic bundle or light pipe for transmission of the electromagnetic radiation concentrated in the planar concentrator to a point of use.

SUMMARY OF THE INVENTION

Briefly stated, the present invention comprises a planar fluorescent solar concentrator having a circular band portion within said concentrator toward which incident solar radiation is redirected. Optically coupled to said circular band portion is an optical means comprising an axially symmetrical body of light transmitting material having a circular band at one end of the receipt therein of radially direction electromagnetic radiation, said optical means including a body portion, having a coating on the exterior surfaces thereof and a generally circular second end. Light radially directed in said circular band at said first end is internally reflected in said body portion and directed toward said second end, whereby the light leaving that circular second end is distributed substantially uniformly over the entire area thereof.

The precise characteristics and features of the invention will become more readily apparent from the following detailed description when read in light of the accompanying drawings.

DETAILED DESCRIPTION OF THE INVENTION

Figure 1:
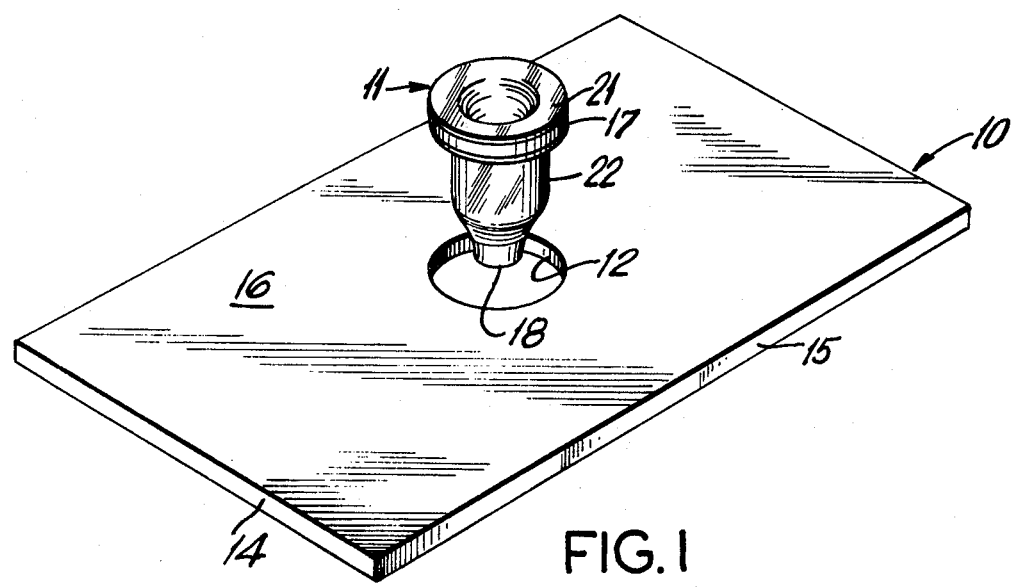
FIG. 1 is an isometric drawing of one embodiment of the present invention showing a planar fluorescent solar collector and the optical means, prior to assembly and optical coupling thereof.
Figure 4:
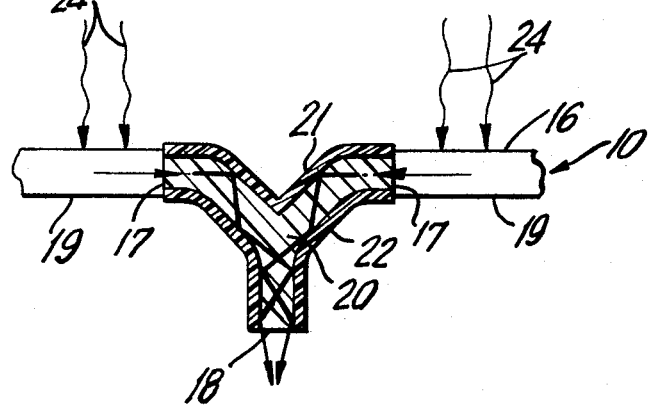
FIG. 4 is a cross-sectional view similar to FIG. 3 showing another embodiment of the present invention.

The planar fluorescent solar concentrator of the present invention with its associated optical means is schematically illustrated in FIGS. 1 and 4 of the drawings. Referring specifically, however, to FIG. 1, and in accordance with this invention, a planar fluorescent solar collector 10 is provided for the receipt of incident solar radiation.

Planar fluorescent concentrators, of course, are well known in the art and consist, for example, of layers of dyes on light transparent slabs of material or consist of glass containing fluorescent chelates, certain inorganic ions, or the like.

In accordance with this invention, both sidewalls (one of which is designated 15 in FIG. 1) and both endwalls (one of which is designated 14 in FIG. 1) of the planar fluorescent concentrator 10 are preferably coated with a light reflecting material, such as aluminum, silver, and the like. The bottom surface (designated as 19 in FIG. 4) of the planar fluorescent concentrator 10 is coated with a light reflective material such as a silver or aluminum mirror, for example. Importantly, fluorescent planar concentrator 10 is provided with at least one internal, substantially circular aperture defining a substantially circular edge band portion 12. Light incident on the top surface 16 of the concentrator 10 is concentrated and transmitted toward the edge of band portion 12.

Figure 2:
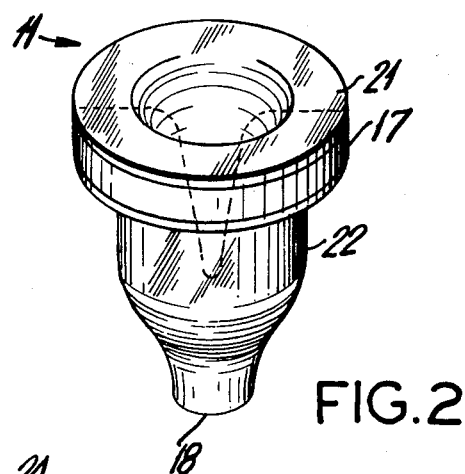
FIG. 2 is a schematic prospective view of the preferred optical means for transmission of light in accordance with the present invention.
Figure 3:
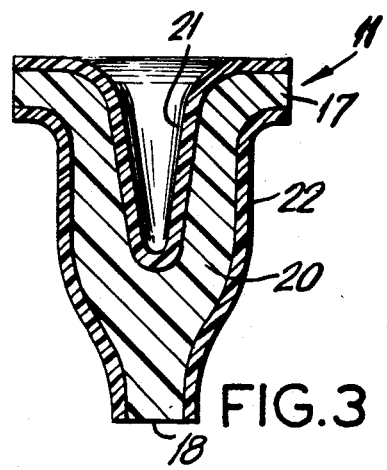
FIG. 3 is a cross-sectional view of the optical means of FIG. 2.

As is shown in FIGS. 1 and 4, the solar concentrator 10 includes an optical means 11. Optical means 11 is designed to be, and is, optically coupled to the band portion 12 of the planar concentrator 10. Consequently, the optical means 11 has at its first end a circular band portion 17 for mating with and being optically coupled to the band portion 12 of concentrator 10. Basically, as can be seen particularly in FIGS. 2 and 3, the optical means 11 is formed from an axially symmetrical body 20 of light transmitting material. At the second end of the optical means 11 is provided a substantially circular area for the exit of light being transmitted through the optical means. The body of the optical means 11 is provided with a coating 21 extending over the entire top surface of the body 20 and a second coating 22 extending over the outer bottom surface of body 20, leaving only the annular ring portion 17 and the circular apex 18 as the only uncoated portions of the optical means 11. The coatings 21 and 22 will generally be of the same type material, e.g. glass, plastic, etc., and have an index of refraction which is less than the index of refraction of the body material 20, whereby the optical means 11 will function substantially as a light pipe or optical wave guide internally reflecting light entering into the optical means 11 at annular ring 17 and transmitting it so as to exit at area 18 of the optical means 11. In the particularly preferred embodiment of the present invention, the optical means 11 is substantially in the form of an inverted bell.

In the embodiment shown in FIG. 4, however, the optical means 11 has a more angular, y-shaped cross-section, as shown therein.

The optical means 11 can be formed from any material used in the formation of optical wave guides, such as glass, plastic, and the like. It is important in the practice of the present invention, however, that the optical means 11 have a light receiving surface which has an area substantially identical to the light emitting surface. Thus, the area of ring 17 of the device shown in FIGS. 1 and 4 is substantially equal to the area of circle 18 in the optical means 11.

As will be readily appreciated, the area of the portion 12 of the solar concentrator 10 is chosen to be consistent with the concentration ratio designed for the collector at its intended use. For example, the greater the concentration of light by the collector, the greater the potential temperature will be where the light is converted into thermal energy; however, significantly high temperatures may not be necessary or desirable in many applications, the heating of home water serving as an illustration of such application. In these instances then the area of the ring portion 17 relative to the area of the solar collecting surface of collector 10 could be increased.

In any event, as is shown in FIG 4, incident radiation on the top surface 16 of the planar concentrator 10 is directed substantially radially into the optical means 11. This is indicated by the arrows. Light that enters into the circular band entrance portion 17 of the optical means 11 is internally reflected and results in the transmission of the light down into the body of the optical means 11 and finally outwardly substantially uniformly through the exit end 18.

Figure 5:
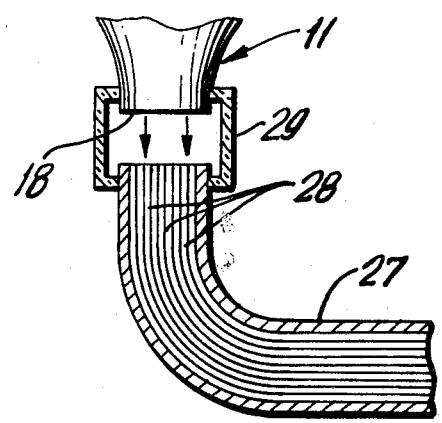
FIG. 5 illustrates a method for coupling a beam of light from said optical means to a bundle of optical fibers or wave guides for transmission of said light to a point of use.

As is shown schematically in FIG. 5, bundle 27 of optical wave guides 28 is positioned so as to receive the radiation exiting from area 18 of the optical means 11, and mechanical means can be used for optically coupling the wave guide bundle 27 to the optical means 11 for receipt of the radiation emanating from exit 18. For example, a mechanical sleeve 29 might be employed. Other coupling devices known for coupling optical wave guides also are useful.

The invention has been described in detail with particular reference to preferred embodiments thereof, but will be understood that reasonable variations and modifications are possible without departing from the spirit and scope of the invention.

What is claimed is:

1. A planar fluorescent concentrator having a surface for receipt of incident solar radiation, the improvement comprising: said planar concentrator having the end walls, side walls and bottom surface coated with a light reflective material, said concentrator having an aperture defining a substantially circular band portion within said concentrator; and, a substantially axially symmetrical light transmitting body having a first end and a circular light transmissive second end, said first end having an annular ring adapted to mate with and optically coupled to said band portion of said concentrator, said light transmitting body having a coating on the exterior surfaces thereof other than said annular ring and said circular light transmissive second end whereby light incident on said planar concentrator is internally reflected and radially directed toward said circulr band, enters said light transmitting body and is directed to and exits from said second end of said light transmitting body.

2. The collector of claim 1 wherein the light transmitting body is substantially in the form of an inverted bell.

3. The collector of claim 1 wherein the light transmitting body is substantially y-shaped in cross-section.

4. The collector of claim 2 or 3 wherein said coating on the exterior surface of said light transmitting body is of the same type of material as said light transmitting body but having a lower index of refraction.

5. A solar collector comprising:

a planar fluorescent concentrator having a top surface of receipt of solar radiation and having end walls, side walls and a bottom surface coated with a light reflective material, said concentrator having an aperture therein defining a substantially circular band portion within said concentrator; and, an optical wave guide having a first end and a second end, said first end having an annular ring portion optically coupled to said band portion of said concentrtor, said optical wave guide extending downwardly from said concentrator, the second end of said wave guide being substantially circular in cross-section, whereby solar radiation incident on said top surface of said concentrator is internally reflected and redirected toward the circular band of the concentrator, radially enters the optical wave guide at the first end and is directed to and exits the second end of the wave guide.

6. The collector of claim 5 wherein the optical wave guide is substantially in the form of an inverted bell.

7. The collector of claim 5 wherein the optical wave guide is substantially y-shaped in cross-section.

* * * * *